(12) United States Patent  
Sakaguchi et al.

(10) Patent No.: US 7,623,200 B2
(45) Date of Patent: Nov. 24, 2009

(54) POLARIZING PLATE, LIQUID CRYSTAL DEVICE, AND ELECTRONIC APPARATUS

(75) Inventors: Masafumi Sakaguchi, Suwa (JP); Yoshitake Tateno, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 11/846,792

(22) Filed: Aug. 29, 2007

(65) Prior Publication Data

US 2008/0055522 A1    Mar. 6, 2008

(30) Foreign Application Priority Data

Aug. 31, 2006   (JP)   .............................. 2006-235855

(51) Int. Cl.
*G02F 1/1335* (2006.01)
(52) U.S. Cl. .......................... 349/96; 349/104; 349/122
(58) Field of Classification Search .................. 349/96, 349/104, 105, 106, 107, 122, 194
See application file for complete search history.

(56) References Cited

U.S. PATENT DOCUMENTS

| 7,153,552 | B2 | 12/2006 | Kubo et al. ................. 428/1.31 |
| 7,502,088 | B2 * | 3/2009 | Suzuki et al. ............... 349/141 |
| 2006/0001799 | A1 * | 1/2006 | Kawamoto et al. ............ 349/96 |
| 2007/0024792 | A1 * | 2/2007 | Chang et al. ................. 349/141 |
| 2008/0055522 | A1 * | 3/2008 | Sakaguchi et al. ............ 349/96 |
| 2008/0062356 | A1 * | 3/2008 | Sakaguchi ................... 349/96 |

FOREIGN PATENT DOCUMENTS

| JP | A 6-59122 | 3/1994 | ................ 349/96 X |
| JP | B2 3327410 | 7/2002 | ................ 349/96 X |
| JP | A-2003-75638 | 3/2003 | ................ 349/96 X |
| JP | A-2003-228058 | 8/2003 | ................ 349/96 X |
| JP | A-2003-255129 | 9/2003 | ................ 349/96 X |
| JP | A-2003-322848 | 11/2003 | ................ 349/96 X |
| JP | A-2004-20993 | 1/2004 | ................ 349/96 X |
| JP | A-2004-301891 | 10/2004 | ................ 349/96 X |
| JP | A-2004-347688 | 12/2004 | ................ 349/96 X |
| JP | A-2005-148519 | 6/2005 | ................ 349/96 X |
| JP | A-2006-163003 | 6/2006 | ................ 349/96 X |
| WO | WO 2006/062109 A1 | 6/2006 | ................ 349/96 X |

* cited by examiner

*Primary Examiner*—Brian M Healy
(74) *Attorney, Agent, or Firm*—Oliff & Berridge PLC

(57) ABSTRACT

The invention provides a polarizing plate used in a liquid crystal device. The polarizing plate according to an aspect of the invention includes: a polarizing film; and a first protection layer that has a predetermined first optical axis, wherein the first protection layer is disposed either directly or indirectly on one surface of the polarizing film with the first optical axis of the first protection layer being aligned in parallel with a transmission axis of the polarizing film.

10 Claims, 7 Drawing Sheets

POLARIZING PLATE, LIQUID CRYSTAL DEVICE, AND ELECTRONIC APPARATUS

BACKGROUND

1. Technical Field

The present invention relates to a polarizing plate used for, for example, a liquid crystal device having liquid crystal that is driven in a VA (Vertical Aligned) mode, and the liquid crystal device having such a polarizing plate. In addition, the invention further relates to an electronic apparatus including, but not limited to, a liquid crystal projector or a direct-view type display device that is provided with such a liquid crystal device.

2. Related Art

A liquid crystal device of the above-described type nas, typically, a polarizing plate on either surface of its liquid crystal panel. Such a polarizing plate is configured to include a polarizing element, which has a polarizing film made of polyvinyl alcohol (PVA), etc., that defines polarization of light and protection layers each of which is deposited on either surface of the polarizing film and is made of cellulose triacetate (TAC), etc., and to further include a supporting substrate that supports these components. One polarizing plate that is provided at the incoming-light side (i.e., light-incident side) of the liquid crystal panel selectively transmits, among all incident light that enters the incoming-light-side polarizing plate, linearly polarized light that has an amplitude component parallel to the transmission axis of its polarizing film, and then emits the transmitted linearly polarized light to the liquid crystal panel. The other polarizing plate that is provided at the outgoing-light side (i.e., light-emitting side) of the liquid crystal panel selectively emits, among all emission light that goes out from the liquid crystal panel, linearly polarized light that has an amplitude component in a predetermined direction at a display region of the liquid crystal device.

In a related-art liquid crystal device having such a configuration, it is frequent that the transmission axis of the polarizing film and the optical axis of the protection layer get shifted from each other either at the time of production of such a polarizing plate or due to poor axial alignment precision thereof. Since the contrast of the liquid crystal device decreases when an axial shift occurs, as a conventional solution proposed by, among other publications, Japanese Patent No. 3327410, each of the protection layers such as TAC layers is configured to be thin such that the protection layer has a low retardation value, thereby reducing or mitigating any impact of the optical-axis shift of the protection layer on the contrast performance of the liquid display device.

Disadvantageously, however, a polarizing plate having protection layers that are made of organic material such as TAC, the protection layer itself could become distorted due to external factors, for example, heat, mechanical stress, etc. Such a distortion would in turn form a plurality of optical axes extending in directions varying from one to another in the distorted protection layer. These plurality of optical axes change the birefringence in each region of the distorted protection layer, which results in the deteriorated contrast of the liquid crystal device having the affected polarizing plate.

The above problem of related art is further described in detail as follows. In a theoretical sense, if the transmission factor, or in other words, transmissivity, of the liquid crystal device is measured under the "cross nicol" arrangement of two polarizing plates where the transmission axis of one of the polarizing plates are arranged to be orthogonal to that of the other polarizing plate, the transmission factor would be zero percent when the angle of the transmission axis of each of the polarizing films is aligned with the angle of the optical axis, such as a phase-delay axis or a phase-advance axis, of the corresponding protection layer. However, even a slightest shift between the transmission axis of the polarizing film and the optical axis of the protection layer raises the transmission factor. That is, due to the distortion of TAC functioning as the protection layers, optical axes varying in angle thereof from one to another would be formed in the TAC, which results in a disadvantageously heightened transmission factor in the cross nicol arrangement. If such an undesirable polarizing plate is built in a liquid crystal device, the transmission factor of the liquid crystal device in a black display operation state will become higher so as to decrease contrast thereof. Since the decrease in contrast is attributable to the distortion of the protection layer, the phenomenon of contrast decrease become more perceivable as the film thickness of the protection layer such as SAC is made thinner. Moreover, such a phenomenon of contrast decrease is more perceivable in a vertical-alignment display scheme (i.e., VA mode) where images are displayed under a "normally-black" mode.

SUMMARY

An advantage of some aspects of the invention is to provide a polarizing plate having protection layers that have no or, if any, minimum influence on polarization of light performed by its polarizing film. Another advantage of some aspects of the invention is to provide a liquid crystal device having such a polarizing plate to ensure high-definition quality images to be displayed with high contrast. Still another advantage of some aspects of the invention is to provide an electronic apparatus such as, without any limitation thereto, a liquid crystal projector that is provided with such a liquid crystal device.

In order to address the above problem, the invention provides, as an aspect thereof, a polarizing plate used in a liquid crystal device, the polarizing plate including: a polarizing film; and a first protection layer that has a predetermined first optical axis, wherein the first protection layer is disposed either directly or indirectly on one surface of the polarizing film. The first optical axis of the first protection layer is aligned parallel with a transmission axis of the polarizing film.

The polarizing plate according to an aspect of the invention is, for example, provided on at least one or the incoming-light side and the outgoing-light side of the liquid crystal panel of the liquid crystal device. Such a polarizing plate defines the amplitude direction of either an incoming light that enters the liquid crystal panel or an outgoing light that is modulated by the liquid crystal panel. The first protection layer has the first optical axis. The first protection layer is disposed at the side of one surface ("on" one surface in an embodiment of the invention, but not limited thereto) of the polarizing film in such a manner that the first optical axis of the first protection layer is in parallel with the transmission axis of the polarizing film. Herein, the polarizing film and the first protection layer are adhered to each other by means of adhesive means such as bonding agent, etc. that allows a retardation value thereof to be ignored substantially.

When the polarizing plate according to an aspect of the invention is provided at the outgoing-light side of the liquid crystal panel in such a manner that the first protection layer faces toward the liquid crystal panel, the modulated light that is emitted from the liquid crystal panel enters the first polarizing film without being subjected to light polarization at the first protection layer. Then, light having an amplitude component in parallel with the transmission axis of the first polarizing film is selectively emitted through the first polarizing film. Therefore, almost none of the modulated light, which has been subjected to optical modulation at the liquid crystal panel, is polarized, at the first protection layer. That is, the light that has been modulated at the liquid crystal panel enters the first polarizing film almost without having been polarized at the first protection layer at all. Then, the modulated light having an amplitude component in parallel with the transmission axis of the first polarizing film is selectively emitted through the first polarizing film. On the other hand, the modulated light having an amplitude component orthogonal to the transmission axis of the first polarizing film is not transmitted through the first polarizing film.

When the polarizing plate according to an aspect of the invention is provided at the incoming-light side of the liquid crystal panel in such a manner that the first protection layer faces toward the liquid crystal panel, the polarized light that has been polarized at the (second) polarizing film enters the liquid, crystal panel without having been polarized by the first protection layer. Thus, the liquid crystal layer carries out optical modulation of light as designed based on linearly polarized light. With such a polarizing plate according to an aspect of the invention, it is possible to enhance the contrast of the limpid crystal device either because the phase of light that is prior to being subjected to optical modulation by, for example, a VA-mode liquid crystal layer is not disarranged (i.e., never undesirably shifted) by the first protection layer, because the phase of light that is after being subjected to optical modulation by the liquid crystal, layer is not disarranged by the first protection layer, or because of both thereof.

The polarizing plate according to the above aspect of the invention further includes, preferably, a second protection layer that has a predetermined second optical axis, wherein the second protection layer is disposed either directly or indirectly on the other surface of the polarizing film. The second optical axis of the second protection layer is aligned parallel with the transmission axis of the polarizing film.

With such a configuration, it is possible to selectively emit light that has an amplitude component parallel to the transmission axis of the polarizing film through the polarizing plate because the phase of light that enters the polarizing film or the phase of light that has been polarized by the polarizing film is not disarranged thereby.

In the polarizing plate according to the above aspect the invention, it is preferable that at least one of the first protection layer and the second protection layer serves, in addition to at least one other function, as a supporting substrate that supports the polarizing film.

With such a configuration, it is possible to reduce a risk of external stress such as thermal expansion, thermal contraction, etc., that could be applied to the polarizing film without necessity to provide any additional supporting substrate. Thus, it is possible to prevent the polarizing plate from being deformed.

In the polarizing plate according to the above aspect of the invention, it is preferable that the polarizing film is sandwiched between the first protection layer and the second protection layer, and the first protection layer and the second protection layer are adhered to each other by means of a frame-shaped sealant.

With such a configuration, the portion of the polarizing film corresponding to the display region does not contact the sealant directly. Therefore, no substantial external stress is applied to the polarizing film which prevents the polarizing film from being deformed.

In the polarizing plate according to the above aspect of the invention, it is preferable that at least one of the first protection layer and the second protection layer is made of sapphire or crystal.

With such a configuration, it is possible to prevent the yellow discoloration of the polarizing film caused by TAC because any protection layer made of TAC is not used, meaning that the invention prevents the aged deterioration of the polarizing film effectively.

In order to address the above problem, the invention provides, as another aspect thereof, a liquid crystal device including: a liquid crystal layer, a incoming-light-side polarizing plate that is provided at the incoming-light side of the liquid crystal layer; and an outgoing-light-side polarizing plate that is provided at the outgoing-light side of the liquid crystal layer, the outgoing-light-side polarizing plate including a first polarizing film and a first protection layer that has a predetermined first optical axis, wherein the first protection layer is disposed at one side of the first polarizing film that is closer to the liquid crystal layer than the other side thereof in such a manner that the first optical axis of the first protection layer is in parallel with a transmission axis of the first polarizing film.

In a liquid crystal device according to another aspect of the invention, the first polarizing film is constituted as an organic film made of, for example, PVA, etc., which is formed in a film shape. The first polarizing film emits light that has entered into the first polarizing film itself without losing the property/characteristic of linearly polarized light.

Tere first protection layer, which has the first optical axis, is disposed at a side of the first polarizing film that is closer to the liquid crystal layer (when viewed from the first polarizing film) than an other side of the first polarizing film. The first optical axis of the first protection layer is aligned parallel with the transmission axis of the first polarizing film. Herein, the first polarizing film and the first protection layer are adhered to each other by means of adhesive means such as bonding agent, etc. that allows a retardation value thereof to be ignored substantially.

A liquid crystal device according to another aspect of the invention is configured in such a manner that the first protection layer of the outgoing-light-side polarizing plate thereof is disposed at a side where an outgoing light is emitted when viewed from the liquid crystal layer, more specifically, at the liquid-crystal-layer side of the first polarizing film. Therefore, light that has been subjected to optical modulation at the liquid crystal layer is emitted from the first polarizing film as linearly polarized light. With such a configuration of the polarizing plate, among all of light that has been modulated by the liquid crystal layer operating in, for example, the VA mode, light having an amplitude component parallel to the transmission axis of the first polarizing film only is selectively emitted from the display region of the liquid crystal device. Conversely, among all of the modulated light, the first polarizing film absorbs light having an amplitude component orthogonal to the transmission axis of the first polarizing film, thereby effectively preventing the occurrence of any optical leakage. Therefore, dull black having low gradation is displayed in the display region of the liquid crystal device. Therefore, since a liquid crystal, device according to another aspect of the invention offers black display with lower gradation, the contrast of the liquid crystal device is relatively enhanced.

In the liquid crystal device according to another aspect of the invention described above, it is preferable that the outgoing-light-side polarizing plate includes a second protection layer that is disposed at the other side of the first polarizing film opposite to said side of the first polarizing film that is closer to the liquid crystal layer, the second protection layer has a predetermined second optical, axis, and the second protection layer is disposed with the second optical axis of the second protection layer being aligned in parallel with the transmission axis of the first polarizing film.

With such a configuration, it is possible to selectively emit light that has an amplitude component parallel to the transmission axis of the first polarizing film through the outgoing-light-side polarizing plate because the phase of light that enters the first polarizing film is not disarranged thereby.

In the liquid crystal device according to another aspect of the invention described above, it is preferable that at least one of the first protection layer and the second protection layer serves, in addition to at least one other function, as a supporting substrate that supports the first polarizing film.

with such a configuration, it is possible to reduce a risk of external stress such as thermal expansion, thermal contraction, etc., that could be applied to the first polarizing film without necessity to provide any additional supporting substrate. Thus, it is possible to prevent the outgoing-light-side polarizing plate from being deformed.

In the liquid crystal device according to another aspect of the invention described above, it is preferable that at least one of the first protection layer and the second protection layer is made of sapphire or crystal.

With such a configuration, it is possible to prevent the yellow discoloration of the first polarizing film caused by TAC because it is not necessary to use the first protection layer made of TAC nor the second protection layer made thereof, which means that the invention prevents the aged deterioration of the first polarizing film effectively.

In the liquid crystal device according to another aspect of the invention described above, it is preferable that the incoming-light-side polarizing plate includes a second polarizing film and a third protection layer that has a predetermined third optical axis, and the third protection layer is disposed at a side of the second polarizing film that is closer to the liquid crystal layer than an other side of the second polarizing film. The third optical axis of the third protection layer is aligned parallel with the transmission axis of the second polarizing film.

With such a configuration, it is possible to selectively emit light that has an amplitude component parallel to the transmission axis of the second polarizing film to the liquid crystal layer because the phase of light that has been polarized by the second polarizing film is not disarranged by the third protection layer.

In the liquid crystal device according to another aspect of the invention described above, it is preferable that the incoming-light-side polarizing plate includes a fourth protection layer that is disposed at the other side of the second polarizing film opposite to said side of the second polarizing film that is closer to the liquid crystal layer, the fourth protection layer has a predetermined fourth optical axis, and the fourth protection layer is disposed with the fourth optical axis of the fourth protection layer being aligned in parallel with the transmission axis of the second polarizing film.

With such a configuration, it is possible to selectively emit light that has an amplitude component parallel to the transmission axis of the second polarizing film to the liquid crystal layer because the phase of light that enters the second polarizing film is not disarranged thereby.

In the liquid crystal device according to another aspect of the invention described above, it is preferable that at least one of the third protection layer and the fourth protection layer serves, in addition to at least one other function, as a supporting substrate that supports the second polarizing film.

With such a configuration, it is possible to reduce a risk of external stress such as thermal expansion, thermal contraction, etc, that could be applied to the second polarizing film without necessity to provide any additional supporting substrate. Thus, it is possible to prevent the incoming-light-side polarizing plate from being deformed.

In the liquid crystal device according to another aspect of the invention described above, it is preferable that at least one of the third protection layer and the fourth protection layer is made of sapphire or crystal.

With such a configuration, it is possible to prevent the yellow discoloration of the second polarizing film caused by TAC because it is not necessary to use the third protection layer made of TAC nor the fourth protection layer made thereof, which means that the invention prevents the aged deterioration of the second polarizing film effectively.

In the liquid crystal device according to another aspect of the invention described above, it is preferable that the liquid crystal layer includes liquid crystal molecules having negative anisotropy of dielectric constant, and the incoming-light-side polarizing plate and the outgoing-light-side polarizing plate are provided in such a manner that the transmission axis of the incoming-light-side polarizing plate and the transmission axis of the outgoing-light-side polarizing plate are orthogonal to each other.

In such a configuration, the liquid crystal molecules are driven in the vertical aligned (VA) mode. In additions in such a configuration, the incoming-light-side polarizing plate and the outgoing-light-side polarizing plate are provided in a cross nicol arrangement such that the transmission axis of the incoming-light-side polarizing plate is orthogonal to the transmission axis of the outgoing-light-side polarizing plate. Therefore, images are displayed in a normally black mode. With such a configuration, among other advantages, it is possible to display images with high contrast even with a liquid crystal device that includes liquid crystal molecules having negative anisotropy of dielectric constant, which are more susceptible to adverse effects of a retardation value on the contrast.

In order to address the above problem, the invention provides, as still another aspect thereof, an electronic apparatus that is provided with the liquid crystal device according to the above-described aspect of the invention.

According to an electronic apparatus of this aspect of the invention, it is possible to embody various kinds of electronic devices that are capable of providing a high-quality image display, including but not limited to, a projection-type display device, a mobile phone, an electronic personal organizer, a word processor, a viewfinder-type video tape recorder, a direct-monitor-view-type video tape recorder, a workstation, a videophone, a POS terminal, a touch-panel device, and so forth, because the electronic apparatus of this aspect of the invention is provided with the liquid crystal device according to the above-described aspect of the invention.

These and other features, operations, and advantages of the present invention will be fully understood by referring to the following detailed description in conjunction with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to accompanying drawings, each embodiment of a polarizing plate, a liquid crystal device, and an electronic apparatus according to some aspects of the invention is explained below.

1. Polarizing Plate

Figure 1:
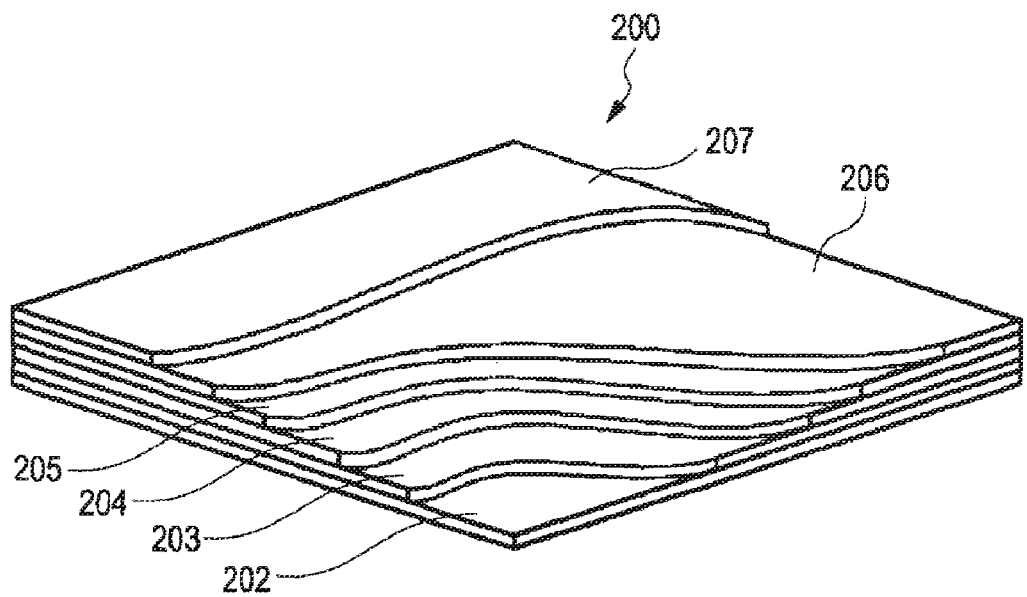
FIG. 1 is a schematic cutaway diagram that illustrates a part of a polarizing plate according to the present embodiment of the invention.
Figure 2:
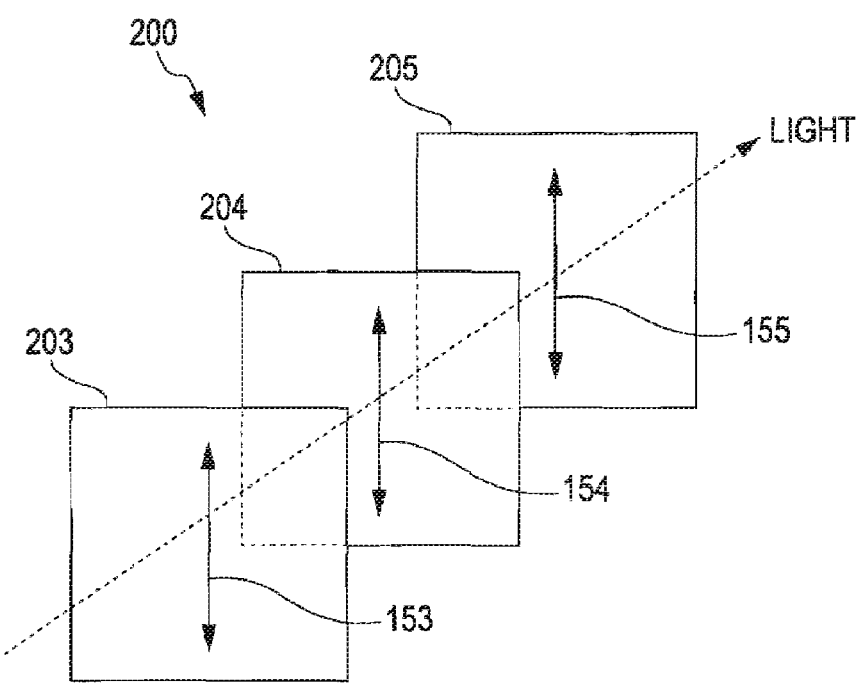
FIG. 2 is a diagram that illustrates, at a conceptually perspective angle, the direction of the optical axis of each supporting substrate and the direction of the transmission axis of a polarizing film.
Figure 3A:
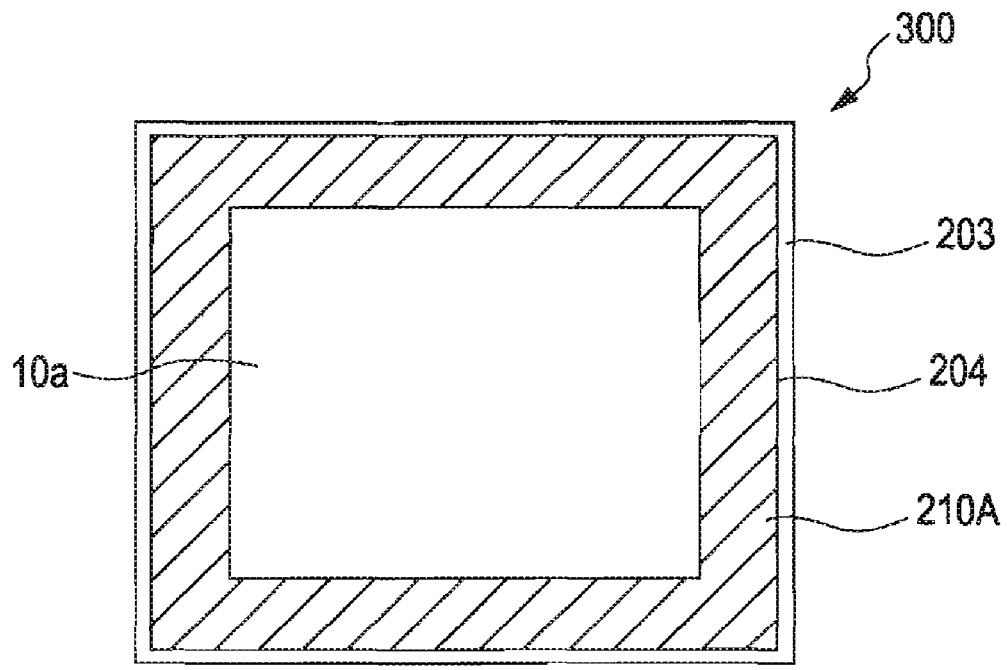
FIGS. 3A and 3B are plane views that schematically illustrate a variation example of the polarizing plate according to the present embodiment of the invention.
Figure 3B:
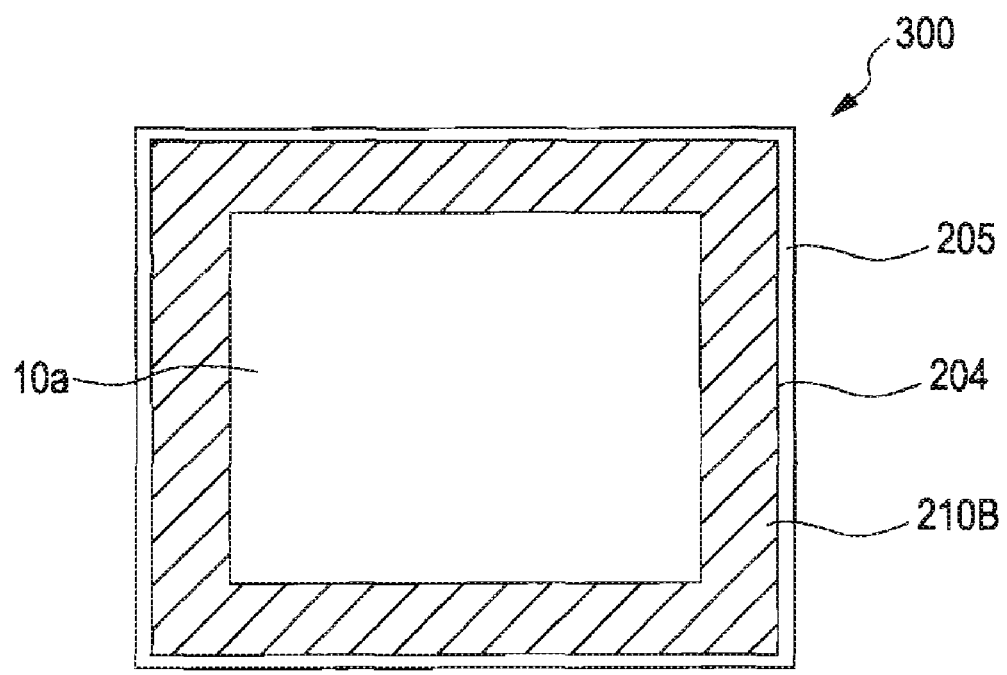

First of all, with reference to FIGS. 1-3, an embodiment of a polarizing plate according to the invention is explained below. FIG. 1 is a schematic cutaway diagram that illustrates a part of a polarizing plate according to the present embodiment of the invention. FIG. 2 is a diagram that illustrates, at a conceptually perspective angle, the direction of the optical axis of each protection layer and the direction of the transmission axis of a polarizing film. FIGS. 3A and 3B are plane views that schematically illustrate a variation example of the polarizing plate according to the present embodiment of the invention. A polarizing plate 200 described in this embodiment of the invention is one that is used for a liquid crystal device such as the light valve of a liquid crystal projector, or the like. In addition, the polarizing plate 200 described in this embodiment of the invention is provided at either the "outgoing-light side" of the liquid crystal layer at which light is emitted from the liquid crystal layer or the "incoming-light side (i.e., incident light side)" thereof at which light enters into the liquid crystal layer, or both thereof, when viewed from the liquid crystal layer, which includes VA-mode-driven liquid crystal that is vertically aligned in its initial orientation state and has negative anisotropy of dielectric constant.

As illustrated in FIGS. 1 and 2, the polarizing plate 200 that is to be built into a liquid crystal apparatus includes a first coating layer 202, a first supporting substrate 203 that is an example of "a first protection layer" according to the invention, a polarizing film 204, a second supporting substrate 205 that is an example of "a second protection layer" according to the invention, a second coating layer 206, and a protection film 207.

Having an antireflection film on the surface thereof, each of the first coating layer 202 and the second coating layer 206 prevents the occurrence of a stray light, retro-reflection, etc., caused by a reflected light while improving a transmission factor. In addition, a protection film such as a hard coat is provided on the uppermost plane thereof for surface protection.

The polarizing plate 200 is fixed to either the TFT array substrate or the counter substrate (i.e., opposing substrate) of the liquid crystal device when the polarizing plate 200 is built into the liquid crystal device. The protection film 207 is used as a member for temporarily protecting the surface of the second supporting substrate 205 during such a production process. It should be noted that the polarizing film 200 is fixed in a state where its protection film 207 has been peeled off.

The polarizing film 204 is an organic film made of, for example, PVA, etc., which is formed in a film shape. The polarizing film 204 emits light that has entered the polarizing film 204 itself as linearly polarized light.

The first supporting substrate 203 and the second supporting substrate 205 prevent the polarizing film 204 from becoming deteriorated due to a change in ambient conditions attributable to, without any limitation thereto, a change in temperature, or moisture. The first supporting substrate 203 is constituted as, for example, a transparent substrate made of a uniaxial crystal such as sapphire or crystal (i.e., quartz), or is constituted from optical material such as a stretched transparent film. The first supporting substrate 203 has the first optical axis 153 only as its optical axis. The first supporting substrate 203 is adhered to one surface of the polarizing film 204 in such a manner that the first optical, axis 153 of the first supporting substrate 203 is in parallel with the transmission axis 154 of the polarizing film 204. Herein, the polarizing film 204 and the first supporting substrate 203 are adhered to each other by means of adhesive means, which is not shown in the drawings, such as bonding agent, adhesive agent, etc. that allows a retardation value thereof to be ignored substantially.

In a case where the polarizing plate 200 is provided at the outgoing-light side (when viewed from the liquid crystal layer) of the liquid crystal layer where outgoing light that has been modulated by the liquid crystal layer is emitted, the first supporting substrate 203 is provided at the liquid-crystal-layer side (when viewed from the polarizing film 204) of the polarizing film 204.

In such a configuration, modulated light that has entered the first supporting substrate 203 passes through the first supporting substrate 203 without being further modulated thereby since the first optical axis 153 of the first supporting substrate 203 is in parallel with the transmission axis 154 of the polarizing firm 204. Therefore, the brightness of the liquid crystal device is never decreased wastefully because there is no unintended absorption of light at the polarizing film 204, or more specifically, because light having an amplitude component that is not in parallel with the transmission axis 154 of the polarizing film 204 is not absorbed by the polarizing film 204. In addition thereto, it is possible to reduce the deterioration of the polarizing film 204 due to absorption of light, which extends the service life of the polarizing plate 200.

On the other hand, in a case where the polarizing plate 200 is provided at the incoming-light side of the liquid crystal layer, the first supporting substrate 203 is provided at the liquid-crystal-layer side of the polarizing film 204. In such a configuration, light that has been polarized by the polarizing film 204 enters the first supporting substrate 203. Herein, since the optical axis 153 of the first supporting substrate 203 is in parallel with the transmission axis 154 of the polarizing film 204, the phase of light that has been polarized by the polarizing film 204 is never disarranged at the first supporting substrate 203. That is, linearly polarized light that is emitted from the polarizing film 204 is in turn transmitted through the first supporting substrate 203 without being affected thereby to reach the liquid crystal layer. Then, optical modulation is performed at the liquid crystal layer based on the linearly polarized light that has been subjected to polarization at the polarizing film 204. Especially, in a case where the polarizing plate 200 is employed for a liquid crystal panel that is provided with a liquid crystal layer containing VA-mode-driven liquid crystal molecules, the phase of light is never disarranged at any previous optical processing step prior to the optical modulation step where light is subjected to modulation based on the birefringence (i.e., double refraction) of liquid crystal molecules. Therefore, because no interposed medium that generates any phase difference exists between the polarizing film and the liquid crystal layer, it is possible to avoid an undesirable increase in the black transmission factor during black display due to the phase difference, which enhances the contrast of displayed images.

In other words, it is possible to reduce any optical phase shift that could be otherwise caused in accordance with the retardation value of the supporting substrate of the polarizing plate 200. Thus, it is further possible to reduce any contrast degradation due to the optical phase shift.

The second supporting substrate 205, which is made of the same optical material as that of the first supporting substrate 203, has the second optical axis 155 only. In addition, the second supporting substrate 205 is adhered to the other surface of the polarizing film 204 in such a manner that the second optical axis 155 of the second supporting substrate 205 is in parallel with the transmission axis 154 of the polarizing film 204. Therefore, the second supporting substrate 205 protectively supports the polarizing film 204 without affecting the optical polarization of light performed by the polarizing film 204 at all.

Since TAC is not used for the first supporting substrate 203 or the second supporting substrate 205, the polarizing plate 200 is free from a yellow discoloration problem caused by the chemical action of the TAC due to a change in ambient conditions attributable to a change in temperature, moisture, etc. Thus, it is possible to avoid any deterioration in the transmission factor of the polarizing plate or color thereof for a long time.

With the polarizing plate 200 described above, it is possible to enhance the display quality of images, or more specifically, contrast thereof that are offered by a liquid crystal device having the polarizing plate 200.

Variation

Next, with reference to FIG. 3, variation examples of a polarizing plate according to the present embodiment of the invention are explained below. FIG. 3A is a plane view of a polarizing plate 300 according to a variation example of the invention, which is viewed from the first supporting substrate 203. FIG. 3B is a plane view of the polarizing plate 300 according to another variation example of the invention, which is viewed from the second supporting substrate 205. In the following description, the same reference numerals are assigned to the same components as those of the polarizing plate 200, and detailed explanation thereof is omitted.

In FIG. 3A, the first supporting substrate 203 of the polarizing plate 300 and the polarizing film 204 are adhered to each other by means of a frame-shaped sealant portion 210A at the outer region around a display region 10a. The sealant portion 210A is formed along each side thereof that defines the edge of the first supporting substrate 203. Herein, the term "display region" means an area that overlaps an image display region that is made up of arrayed pixels of a liquid crystal device when the polarizing plate 300 is built in the liquid crystal device.

With such a configuration of the polarizing plate 300, since the portion corresponding to the display region of the polarizing film 204 does not directly contact the sealant, which is the adhesive layer, no external stress applies to the display region of the polarizing film 204. Accordingly, it is possible to prevent the polarizing film 204 from becoming deformed.

In FIG. 3B, the second supporting substrate 205 of the polarizing plate 300 and the first supporting substrate 203 are adhered to each other by means of a frame-shaped sealant portion 210B, which is formed along each side that defines the edge of the second supporting substrate 205. With such a configuration of the sealant portion 210B, likewise the sealant portion 210A, it is possible to prevent the polarizing film 204 from becoming deformed. As described above, the sealant portion may be provided at the first-supporting-substrate (203) side or the second-supporting-substrate (205) side.

2. Liquid Crystal Device

Figure 4:
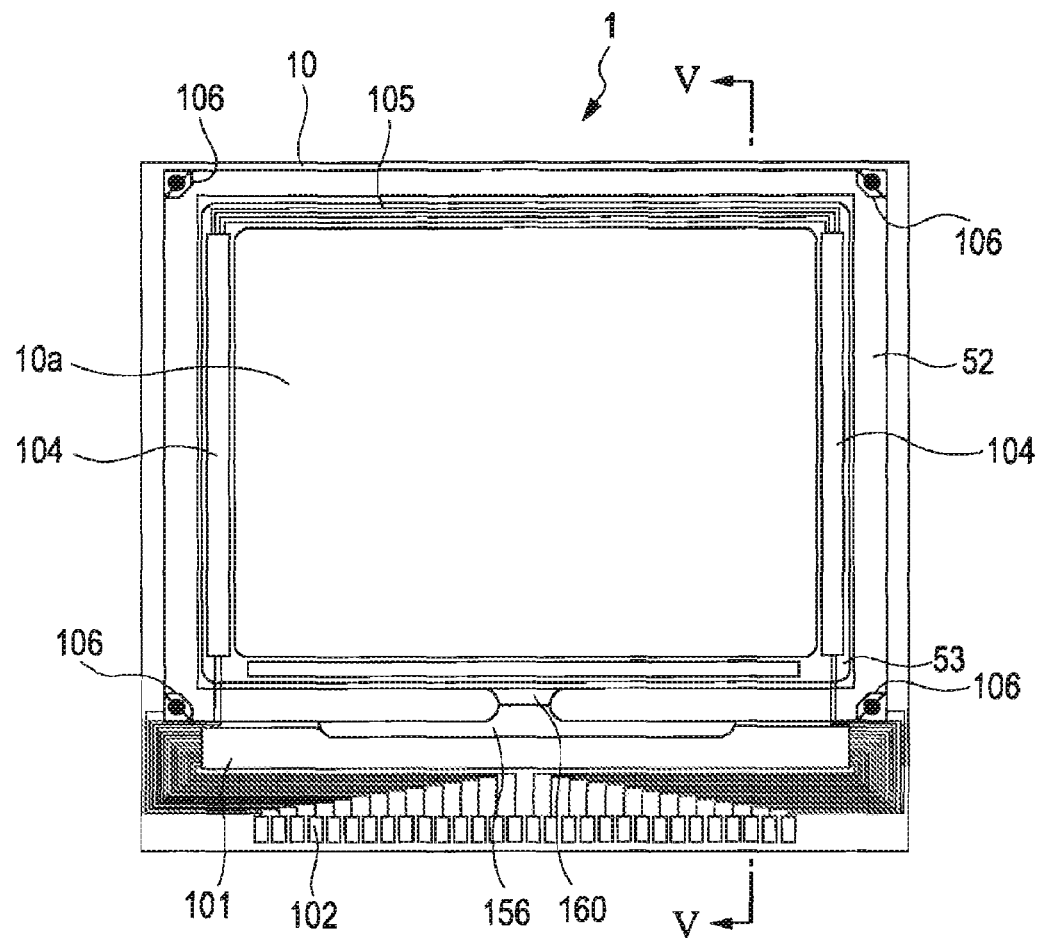
FIG. 4 is a plane view of the liquid crystal device and its constituent elements according to the present embodiment of the invention, which is viewed from a counter substrate.
Figure 5:
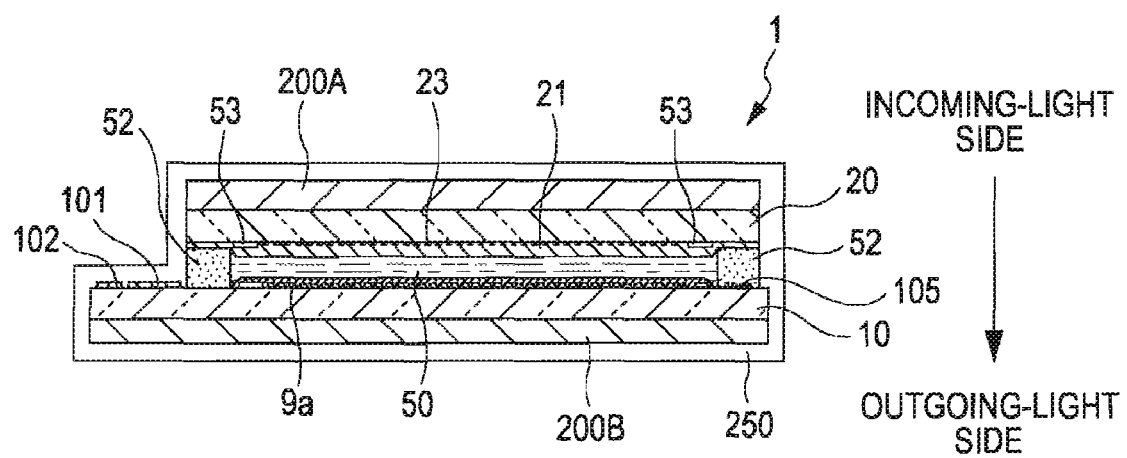
FIG. 5 is a sectional view taken along the line V-V' of FIG. 4.

Next, with reference to FIGS. 4-6, a liquid crystal device according to the present embodiment of the invention is explained below. FIG. 4 is a plane view of the liquid crystal device and its constituent elements according to the present embodiment of the invention, which is viewed from the counter substrate. FIG. 5 is a sectional view taken along the line V-V' of FIG. 4. In the following description of this embodiment of the invention, a liquid crystal device having a built-in TFT active matrix driving circuit is taken as an example.

A liquid crystal device 1 is provided with a TFT array substrate 10, a counter substrate (i.e., opposing substrate) 20, a liquid crystal layer 50, a polarizing plate 200A, and another polarizing plate 200B. In this embodiment of the invention, as illustrated in FIG. 5, a liquid crystal panel and polarizing plates are constituted as a single integral component by means of a block member 250. In addition, in this illustrated embodiment of the invention, this single integral component is electrically connected to an external circuit by means of connection means such as FPC that is not shown in the drawing. However, the invention is never limited to such a specific exemplary configuration. For example, the liquid crystal panel and the polarizing plates may be provided to be opposed to each other with a certain gap provided therebetween. In such an alternative exemplary configuration, the polarizing plates are fixed by fixing clamps, etc., in a rotation-adjustable manner.

The TFT array substrate 10 is made of, for example, a quartz substrate, a glass substrate, a silicon substrate, and the like. The counter substrate 20 is made of, for example, a quartz substrate, a glass substrate, and the like. The TFT array substrate 10 and the counter substrate 20 are bonded to each other with the use of a sealant material 52 that is provided at a sealing region 52a around an image display region 10a at which a plurality of pixels are arrayed to serve as a display area thereof. A liquid crystal layer 50 that is driven in a VA mode is sealed between the TFT array substrate 10 and the counter substrate 20 by means of the sealant material 52 and a liquid crystal sealing portion 156. In particular, a liquid crystal feed opening 160 is sealed by the liquid crystal sealing portion 156 such that liquid crystal that is supplied through the liquid crystal feed opening 160 does not leak therethrough.

Inside the sealing region 52a at which the sealant material 52 is provided and in parallel therewith, a picture frame light-shielding film 53, which has a light-shielding property and defines the picture-frame region of the image display region 10a, is provided on the counter substrate 20 as illustrated in FIG. 4. Among peripheral regions, a data line driving circuit 101 and external circuit connection terminals 102 are provided at one region which lies outside the sealing region 52a at which the sealant material 52 is provided in such a manner that the data line driving circuit 101 and the external circuit connection terminals 102 are provided along one of four sides of the TFT array substrate 10. A sampling circuit 7 is provided inside the sealing region 52a along one of four sides thereof in such a manner that the picture frame light-shielding film 53 encloses the sampling circuit 7. In addition, a pair of scanning line driving circuits 104 is provided inside the sealing region 52a along two of four sides thereof that are not in parallel with the above one side in such a manner that each of the scanning line driving circuits 104 is enclosed by the picture frame light-shielding film 53. Inter-substrate conductive terminals 106, which connect the TFT array substrate 10 with the counter substrate 20 by means of inter-substrate conductive material 107, are provided on the TFT array substrate 10 at positions corresponding to four corners of the counter substrate 20, respectively. With such a structure, it is possible to establish electric conduction between the TFT array substrate 10 and the counter substrate 20.

A wiring pattern that provides electric connection between the external circuit connection terminals 102, the data line driving circuit 101, the scanning line driving circuits 104, the inter-substrate conductive terminals 106, etc., is formed on the TFT array substrate 10.

Though not specifically illustrated in FIG. 5, a layered structure that includes laminations of thin film transistors (TFT) for pixel switching, which function as driving elements, and of circuit lines such scanning lines, data lines, and the like, is formed on the TFT array substrate 10. In the image display region 10a, pixel electrodes 9a that are made of an ITO film are provided at a layer over the wiring structure of the pixel-switching TFTs, the scanning lines, the data lines, and the like. An alignment film (i.e., orientation film) is deposited on the pixel electrodes 9a. On the other hand, a light-shielding film 23 is deposited on the surface of the counter substrate 20 opposite the TFT array substrate 10. Counter electrode 21, which is made of an ITO film likewise the pixel electrodes 9a, is deposited on the light-shielding film 23 in such a manner that the counter electrode 21 is opposed to the plurality of pixel electrodes 9a. Another alignment film is deposited on the counter electrode 21. The liquid crystal layer 50 is configured to include a VA-mode-driven liquid crystal that has negative anisotropy of dielectric constant. The liquid crystal layer 50 is in a predetermined aligned (i.e., oriented) state between a pair of the above-described alignment films. It should be noted that, in this embodiment of the invention, incident light propagates in a direction going from the counter substrate (20) side toward the TFT array substrate (10) side to enter the liquid crystal device 1. In other words, with reference to the above-identified figure (FIG. 5) it propagates in a direction going from the top to the bottom thereof to enter the liquid crystal device 1.

Although it is not specifically illustrated in the drawing, a test circuit, a test pattern, etc., for conducting an inspection on the quality, defects, or the like, of the liquid crystal device during the production process or before shipment thereof may be further provided on the TFT array substrate 10 in addition to the data line driving circuit 101 and the scanning line driving circuits 104.

Next, with reference to FIG. 6, a relative directional relationship between the optical axes of protection layers and the transmission axis of a polarizing film of each of the polarizing plate 200A and the polarizing plate 200B is explained below. FIG. 6 is a conceptual diagram that schematically illustrates an example of a relative directional relationship between the optical axes of the protection layers and the transmission axis of the polarizing film of each of the polarizing plate 200A and the polarizing plate 200B. Note that each of the polarizing plates 200A and 200B has the same configuration as that of the polarizing plate 200 described above. In the following exemplary description, the polarizing plate 200A represents an "incoming-light-side polarizing plate" of the liquid crystal device according to an aspect of the invention, whereas the polarizing plate 200B represents an "outgoing-light-side polarizing plate" thereof. In addition, a supporting substrate 203A is an example of "a third protection layer" of the liquid crystal device according to an aspect of the invention, whereas a supporting substrate 205A is an example of "a fourth protection layer" thereof. On the other hand, a supporting substrate 203B is an example of "a first protection layer" of the liquid crystal device according to the aspect of the invention; whereas a supporting substrate 205B is an example of "a second protection layer" thereof.

Figure 6:
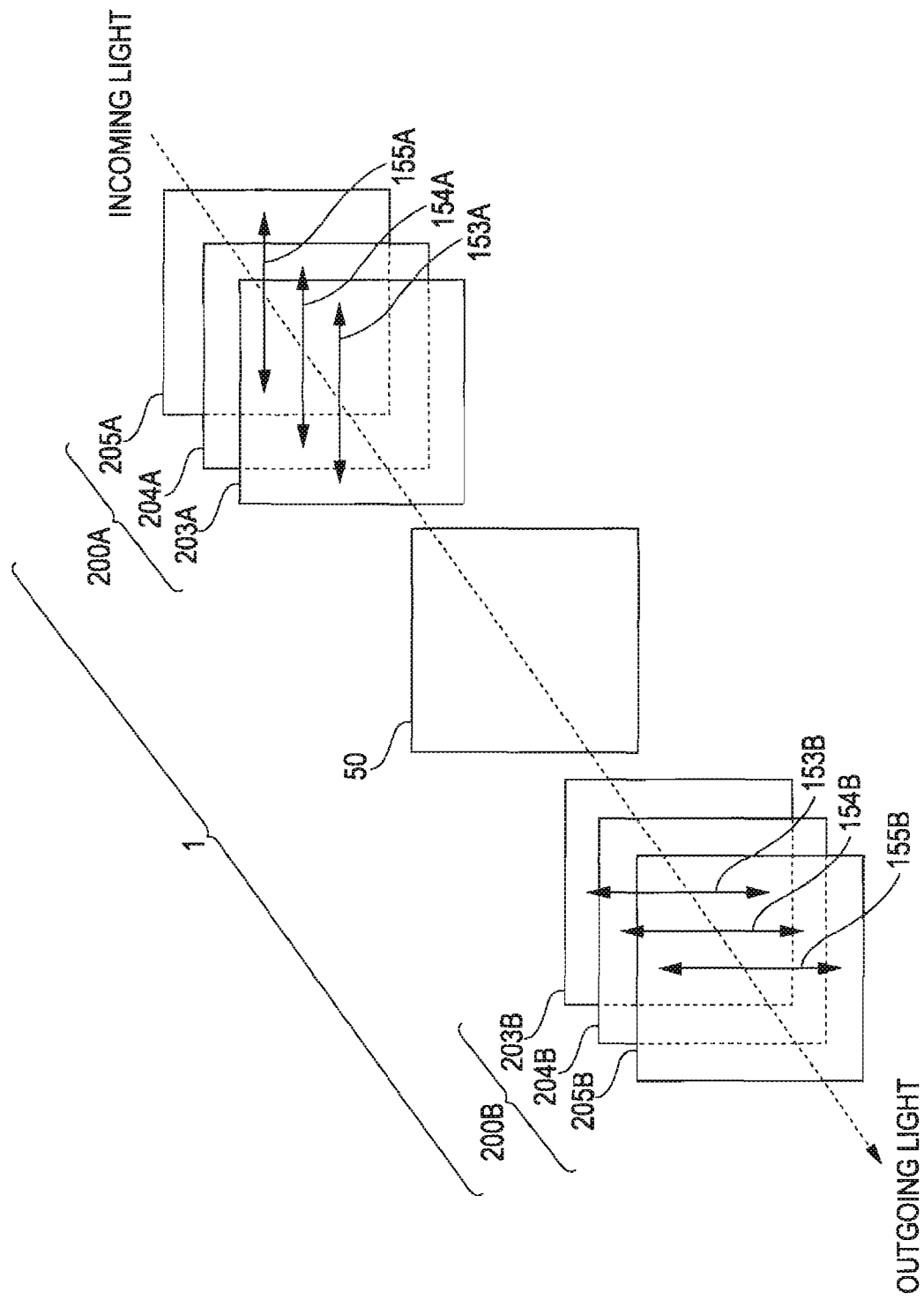
FIG. 6 is a conceptual diagram that schematically illustrates an example of a relative directional relationship between the optical axes of the protection layers and the transmission axis of a polarizing film 204 of each of a polarizing plate 200A and a polarizing plate 200B.

As illustrated in FIG. 6, the liquid crystal device 1 is provided with the polarizing plates 200A and 200B as well as the liquid crystal layer 50. The polarizing plate 200A includes a polarizing film 204A and the supporting substrates 203A and 205A. On the other hand, the polarizing plate 200B includes a polarizing film 204B and the supporting substrates 203B and 205B. The polarizing plate 200A and the polarizing plate 200B are arranged in a cross nicol pattern such that the transmission axis 154A of the polarizing film 204A and the transmission axis 154B of the polarizing film 204B are orthogonal to each other. It should be noted that the liquid crystal, device according to the invention is not limited to the axial direction illustrated in FIG. 6; that is, the liquid crystal device according to the invention also applies to a 90-degree-rotated axial direction with respect thereto, depending on a driving scheme adopted in actual implementation of the invention.

The liquid crystal layer 50 has liquid crystal molecules that are driven in a VA mode, that is, vertically aligned liquid crystal molecules. The liquid crystal device 1 displays images under a normally black mode where display is provided in black in the image display region 10a in a non-driven state.

The supporting substrate 203B has the first optical axis 153B only. The supporting substrate 203B is disposed at the side of one surface (i.e., on one surface according to an embodiment of the invention without any limitation thereto) of the polarizing film 204B that faces toward the liquid crystal layer 50 in such a manner that the first optical axis 153B of the supporting substrate 203B is in parallel with the transmission axis 154B of the polarizing film 204B.

During the operation of the liquid crystal device 1, modulated light that was emitted from the liquid crystal layer 50 to the supporting substrate 203B is transmitted through the supporting substrate 203B without involving any disarrangement (i.e., shift) of the phase thereof. Accordingly, light is detected without losing its linear polarization characteristics. For this reason, it is possible to lower the transmission factor, in a cross nicol arrangement and thereby to obtain black display in low brightness. In addition, it is further possible to prevent any decrease in display luminance. Moreover, because no elliptical polarization occurs in the liquid crystal display 1, it is possible to prevent an increase in the temperature of the polarizing film 204B in accordance with the thermal energy of extra light absorbed by the polarizing film 204B during the operation of the liquid crystal device 1. Thus, is further possible to prevent the polarizing film 204B from becoming distorted and/or degraded due to heat.

Furthermore, since sapphire or crystal, is used as material of at least one of the supporting substrate 203B and the supporting substrate 205B, it is possible to prevent the yellow discoloration of these supporting substrates made of TAC or the like. Therefore, the invention prevents the aged deterioration in the transmission factor of the polarizing plate and/or color thereof effectively.

The supporting substrate 205B has the second optical axis 155B only. The supporting substrate 205B is disposed on the other surface (at the side of the other surface) of the polarizing film 2043B that is opposite the aforementioned liquid-crystal-layer (50) side thereof in such a manner that the second optical axis 155B of the supporting substrate 205B is in parallel with the transmission axis 154B of the polarizing film 204B. Therefore, light that has been transmitted through the polarizing film 204B is emitted from the supporting substrate 205B without involving any decrease nil brightness thereof.

The supporting substrate 203A has the third optical axis 153A only. The supporting substrate 203A is disposed at the liquid-crystal-layer (50) side of the polarizing film 204A in such a manner that the third optical axis 153A of the supporting substrate 203A is in parallel with the transmission axis 154A of the polarizing film 204A.

With such a configuration of the supporting substrate 203A, linearly polarized light that has been emitted from the polarizing film 204A is transmitted through the supporting substrate 203A without being affected thereby to reach the liquid crystal layer 50. Thus, polarization of modulated light that has been subjected to optical modulation at the liquid crystal layer 50 is carried out as designed based on linearly polarized light. According to an exemplary configuration of the polarizing plate 200A described herein, it is possible to enhance the contrast of images displayed by the liquid crystal device 1 because the phase of light is never disarranged at any previous optical processing step prior to the optical modulation step where light is subjected to modulation based on the birefringence of liquid crystal molecules driven in the VA mode. In other words, it is possible to reduce any optical phase shift that could be otherwise caused in accordance with the retardation value of TAC or the like that is interposed between the polarizing film 204A and the liquid crystal layer 50. Thus, it is further possible to reduce any contrast degradation due to the optical phase shift.

The supporting substrate 205A has the fourth optical axis 155A only. The supporting substrate 205A is disposed at the other side opposite the aforementioned liquid-crystal-layer (50) side of the polarizing film 204A in such a manner that the fourth optical axis 155A of the supporting substrate 205A is in parallel with the transmission axis 154A of the polarizing film 204A. With such a configuration, it is possible to effectively transmit linearly polarized light that has been emitted from a polarization conversion element that is used in a liquid crystal projector or the like. Therefore, the polarization degree of the polarizing film is improved. According to an exemplary configuration of the supporting substrates 203A and 205A described herein, it is possible to protect the polarizing film 204A. In addition, it is possible to prevent any stress due to heat from being applied to the polarizing film 204A because at least one of the supporting substrates 203A and 205A is made of sapphire or crystal.

Moreover, as described above, the liquid crystal device 1 according to the present embodiment of the invention does not have any TAC optical layer having a puerility of optical axes interposed between the polarizing film 204A (the polarizing film 204B) and the liquid crystal layer 50. Therefore, it is possible to enhance the contrast of images displayed by the liquid crystal device 1. Furthermore, since the invention reduces the deterioration of a polarizing film due to optical absorption effectively, it is possible to extend the service life of a liquid crystal device.

It is needless to say that, in each of the polarizing plate 200A of the liquid crystal device 1 and the polarizing plate 2003B thereof, likewise the aforementioned polarizing plate 300, one supporting substrate may be adhered to the other supporting substrate by means of a sealant portion which is provided along each side that defines the edge of the polarizing film. Still moreover, it goes without saying that the same effects as those of the VA-mode-driven liquid crystal molecules are produced even when the liquid crystal layer has liquid crystal molecules that are driven in any alternative mode other than the VA mode.

3. Electronic Apparatus

Figure 7:
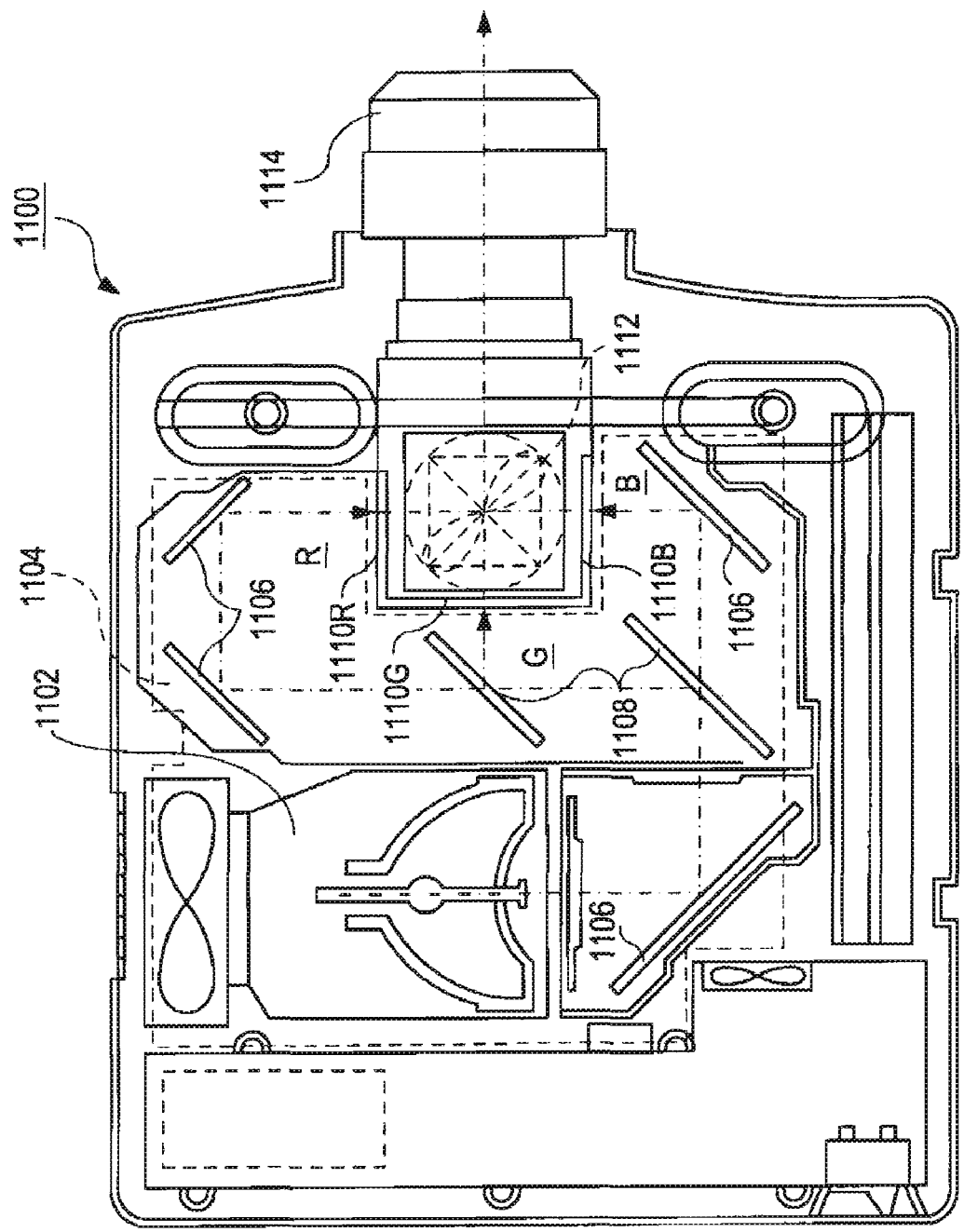
FIG. 7 is a sectional view that schematically illustrates an exemplary configuration of a liquid crystal projector taken as an example of an electronic apparatus according to the invention, which is explained as an exemplary embodiment thereof.

Next, with reference to FIG. 7, the application of the above-described liquid crystal device to a projector, which is an example of various kinds of electronic apparatuses, is explained below. In the following description, it is assumed that the above-described liquid crystal device is used as a light valve for a projector. FIG. 7 is a plane view that schematically illustrates an example of the configuration of a projector. As illustrated in FIG. 7, a lamp unit 1102, which is made of a white light source such as a halogen lamp, or the like, is provided in a projector 1100. A projection light that has been emitted from the lamp unit 1102 is separated into three primary color components of R, G, and B by four mirrors 1106 and two dichroic mirrors 1108 arranged in a light guide 1104. Then, the separated primary color components of R, G, and B enter liquid crystal panels 1110, 1110G, and 1110B, respectively, that function as light valves corresponding to the respective primary color components.

The configuration of the liquid crystal panel 1110R, 1110G, or 1110B is the same as or similar to that of the liquid crystal device described above. Each of these liquid crystal panels 1110R, 110G, and 1110B is driven by the corresponding one of the primary color signals R, G, and B, which are supplied from an image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Focusing attention on a display image offered by each of the liquid crystal panels 1110R, 1110G, and 1110B, it is necessary to reverse the display image of the liquid crystal panel 1110G in a mirror pattern (that is, it is necessary to reverse the left side and the right side thereof) with respect to the display images of the liquid crystal panels 1110R and 1110B.

Because light corresponding to one of the primary colors R, C, and B enters into the corresponding one of the liquid crystal panels 1110R, 1110G, and 1110B thanks to the presence of the dichroic mirror 1108, it is not necessary to provide a color filter thereon. Since the projector 1100 is provided with the liquid crystal panels 1110R, 1110G, and 1110B, it is possible to display high-quaility images.

Figure 8:
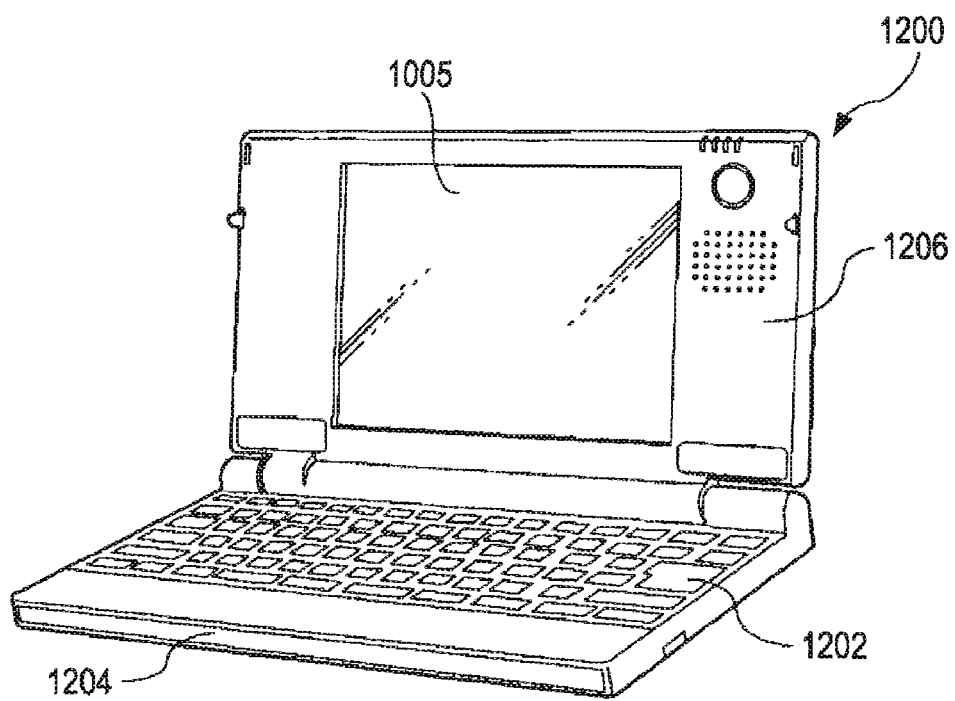
FIG. 8 is a perspective view that schematically illustrates a direct-view-type display device that is taken as another example of an electronic apparatus according to the invention, which is explained as an exemplary embodiment thereof.

Next, an explanation is given below of an exemplary implementation of the invention where the liquid crystal device described above is applied to a mobile personal computer. FIG. 8 is a perspective view that schematically illustrates an example of the configuration of a mobile personal computer. A personal computer is made up of a computer main assembly 1204, which is provided with a keyboard 1202, and a liquid crystal display unit 1206 to which the above-described liquid crystal device is applied. With the personal computer 1200 having such a configuration, is possible to display high-quality images on the liquid crystal display unit 1206 thereof.

Figure 9:
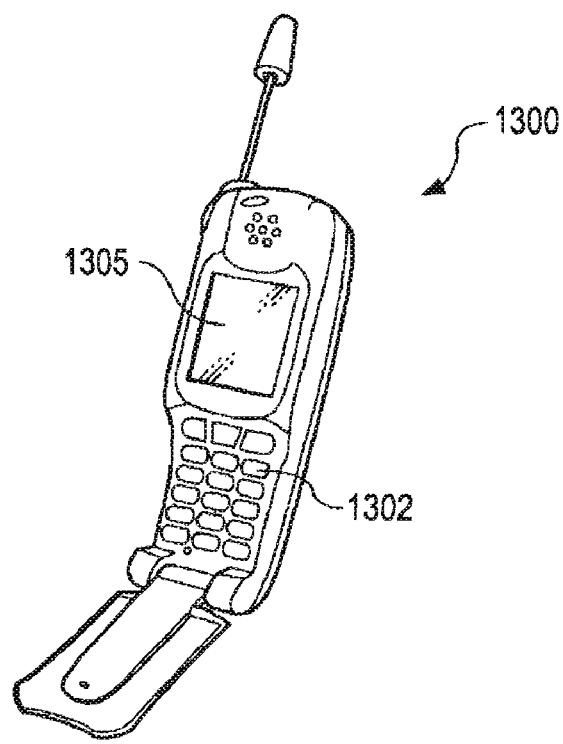
FIG. 9 is a perspective view that schematically illustrates a mobile terminal that is taken as still another example of an electronic apparatus according to the invention, which is explained as an exemplary embodiment thereof.

Moreover, an explanation is given below of another exemplary implementation of the invention where the liquid crystal device described above is applied to a mobile phone. FIG. 9 is a perspective view that schematically illustrates an example of the configuration of a mobile phone. As illustrated in FIG. 9, a mobile phone 1300 is provided with a reflective-type liquid crystal device 1305, which the liquid crystal device of the invention described above is applied to, together with a plurality of user manipulation buttons 1302. In the configuration of the liquid crystal device 1305, a front light is provided on at least one of the front surface and the rear surface thereof as may be necessary; and therefore, it is possible to display high-quality images even when the amount of light coming from the outside is not available.

Among a variety of electronic apparatuses to which the liquid crystal device according to the invention could be embodied are, in addition to the electronic apparatuses (a projector, a personal computer, and a mobile phone) explained above, a liquid crystal display television, a viewfinder-type video recorder, a direct-monitor-view-type video recorder, a car navigation device, a pager, an electronic personal organizer, an electronic calculator, a word processor, a workstation, a videophone, a POS terminal, a touch-panel device, and so on. Needless to say, the invention is also applicable to various electronic apparatuses without any limitation to those mentioned above.

The present invention should in no case be interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as appended claims. A polarizing plate subjected to such a modification, alteration, change, adaptation, and/or improvement, a liquid crystal device having such a polarizing plate subjected thereto, and an electronic apparatus that is provided with such a liquid crystal device, are also within the technical scope of the invention.

In the above exemplary embodiments/examples, it may be configured that each supporting substrate is used as a protection layer, and is adhered to another supporting substrate. Even if the polarizing plate according to the invention has such an alternative configuration, it is still possible to produce the same advantageous effects as those explained in each of the above embodiments/examples, which is achieved by providing the polarizing plate in such a manner that the protection layer having an optical axis is disposed at the liquid-crystal-panel side of the polarizing film.

4. Light Valve

Figure 10:
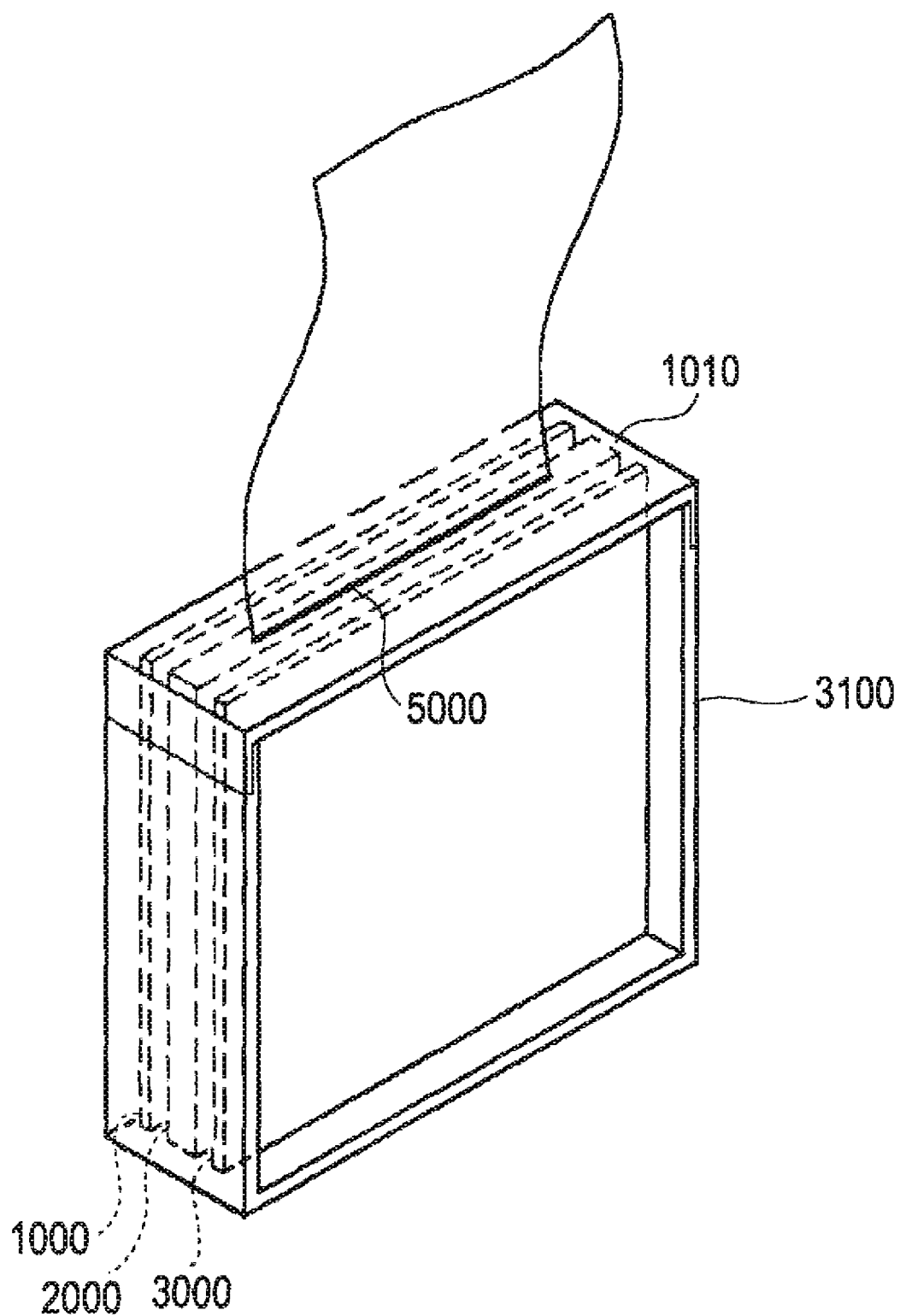
FIG. 10 is a perspective view that schematically illustrates an exemplary configuration of a light valve taken as an example of a liquid crystal device according to the invention, which is explained as an exemplary embodiment thereof.

Next, with reference to FIG. 10, the application of the above-described liquid crystal device to the light valve of a projector, where the projector is an example of various kinds of electronic apparatuses, is explained below. As illustrated in FIG. 10, a light valve 1010 is "enblocked" by a block member 3100. The light valve 1010 has a configuration in which a portion corresponding to the light valve in an optical system for projection of a projector is separated therefrom. The light valve 1010 having such a configuration may be applied to single-chip projectors as well as multi-chip projectors. A flexible printed circuit board that is connected to a liquid crystal panel 2000 is dragon out through a slit 5000, which is formed at a certain position of the block member 3100 corresponding to the liquid crystal panel 2000.

Although FIG. 10 illustrates that the liquid crystal panel 2000 is opposed to a polarizing plate 1000 with a certain gap left therebetween whereas the liquid crystal panel 2000 is further opposed to a polarizing plate 3000 with a certain gap left therebetween, the invention is not limited to such an illustrated configuration. That is, as an alternative configuration, the liquid crystal panel and the polarizing plate may constitute a pair. Even in such an alternative configuration, a pair of the liquid crystal panel and the polarizing plate is provided in such a manner that they are opposed to each other with a certain gap left therebetween. It should be noted that the liquid crystal device according to the invention may be implemented as, in addition to a liquid crystal device having a polarizing plate(s) functioning as a light valve, a liquid crystal device functioning as an optical projection system having a liquid crystal panel serving as a light valve and a polarizing plate(s) opposed to the liquid crystal panel with a certain gap left therebetween.

The entire disclosure of Japanese Patent Application No. 2006-235855, filed Aug. 31, 2006 is expressly incorporated by reference herein.

What is claimed is:

1. A liquid crystal device comprising:
    a liquid crystal layer;
    an incoming-light-side polarizing plate that is provided at the incoming-light side of the liquid crystal layer; and
    an outgoing-light-side polarizing plate that is provided at the outgoing-light side of the liquid crystal layer, the outgoing-light-side polarizing plate including a first polarizing film and a first protection layer that has a predetermined first optical axis,
    wherein the first protection layer is disposed at a side of the first polarizing film that is closer to the liquid crystal layer than an other side of the first polarizing film, the first optical axis of the first protection layer being aligned in parallel with a transmission axis of the first polarizing film,
    the liquid crystal layer includes liquid crystal molecules having negative anisotropy of dielectric constant, and
    the incoming-light-side polarizing plate and the outgoing-light-side polarizing plate are provided in such a manner that the transmission axis of the incoming-light-side polarizing plate and the transmission axis of the outgoing-light-side polarizing plate are orthogonal to each other.

2. The liquid crystal device according to claim 1, wherein the outgoing-light-side polarizing plate includes a second protection layer that is disposed at the other side of the first polarizing film opposite to said side of the first polarizing film that is closer to the liquid crystal layer, the second protection layer has a predetermined second optical axis, and the second protection layer is disposed with the second optical axis of the second protection layer being aligned in parallel with the transmission axis of the first polarizing film.

3. The liquid crystal device according to claim 2, wherein at least one of the first protection layer and the second protection layer serves, in addition to at least one other function, as a supporting substrate that supports the first polarizing film.

4. The liquid crystal device according to claim 3, wherein at least one of the first protection layer and the second protection layer is made of sapphire or crystal.

5. The liquid crystal device according to claim 1, wherein the incoming-light-side polarizing plate includes a second polarizing film and a third protection layer that has a predetermined third optical axis, and the third protection layer is disposed at a side of the second polarizing film that is closer to the liquid crystal layer than an other side of the second polarizing film, the third optical axis of the third protection layer being aligned in parallel with a transmission axis of the second polarizing film.

6. The liquid crystal device according to claim 5, wherein the incoming-light-side polarizing plate includes a fourth protection layer that is disposed at the other side of the second polarizing film opposite to said side of the second polarizing film that is closer to the liquid crystal layer, the fourth protection layer has a predetermined fourth optical axis, and the fourth protection layer is disposed with the fourth optical axis of the fourth protection layer being aligned in parallel with the transmission axis of the second polarizing film.

7. The liquid crystal device according to claim 6, wherein at least one of the third protection layer and the fourth protection layer serves, in addition to at least one other function, as a supporting substrate that supports the second polarizing film.

8. The liquid crystal device according to claim 7, wherein at least one of the third protection layer and the fourth protection layer is made of sapphire or crystal.

9. An electronic apparatus that is provided with the liquid crystal device according to claim 1.

10. The liquid crystal device according to claim 4,
the supporting substrate being attached to the surface of the first polarizing film by a seal material formed in a frame shape so as to surround the portion corresponding to a display area of a surface of the first polarizing film.

* * * * *